April 10, 1951   D. A. HALL   2,548,259
LIFT PIN FOR COUPLING TRAILER AND DRAFT VEHICLES
Filed March 12, 1948
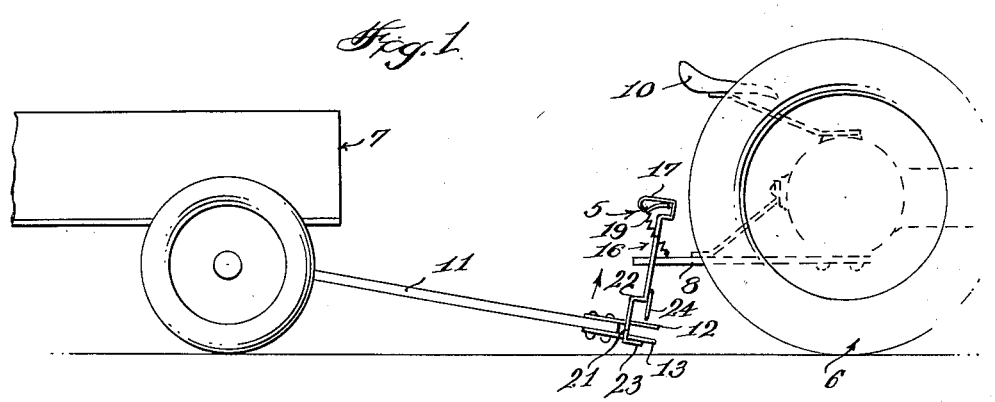
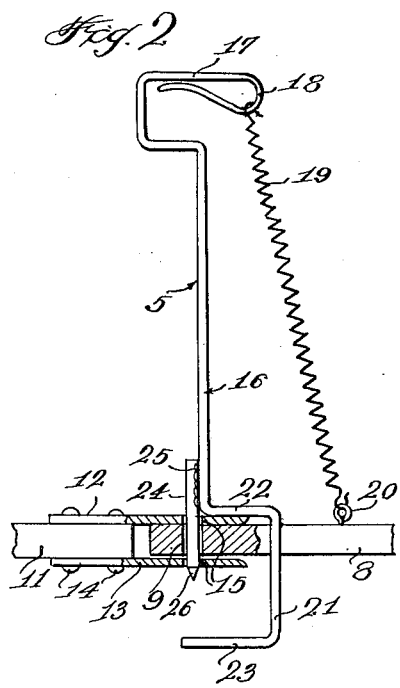
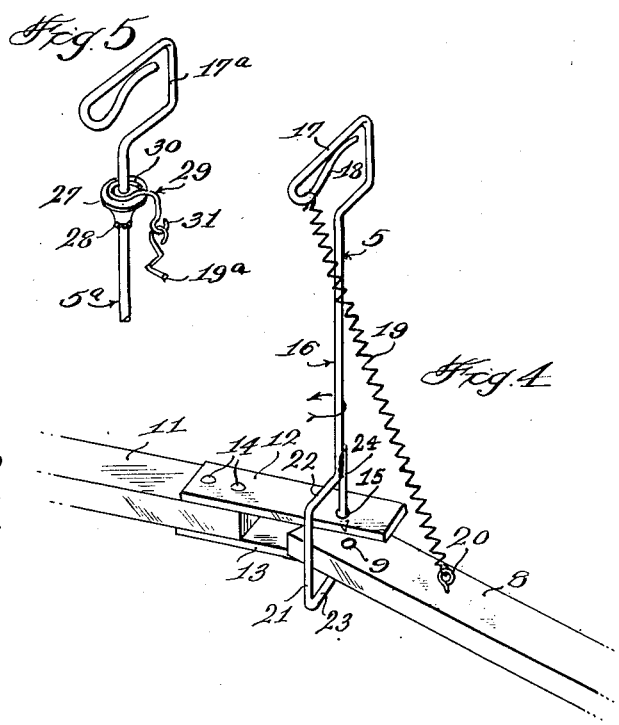
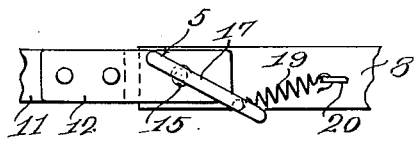
Inventor
David A. Hall
By John N. Randolph
ATTORNEY Patented Apr. 10, 1951

2,548,259

UNITED STATES PATENT OFFICE 2,548,259

LIFT PIN FOR COUPLING TRAILER AND DRAFT VEHICLES

David A. Hall, Sheridan, Ill.

Application March 12, 1948, Serial No. 14,424

6 Claims. (Cl. 280—33.15)

This invention relates to an improved combination lifting and coupling pin for use in coupling a trailer vehicle to a draft vehicle and which is especially adapted for use with farm tractors employed as draft vehicles and to enable the operator to couple and uncouple various types of farm vehicles commonly drawn by tractors and without leaving his seat on the tractor.

Another object of the invention is to provide a combination lifting and coupling pin which may be readily utilized for bringing the openings or opening of the tongue of a trailer vehicle into registry with an opening of the drawbar of a tractor so that the pin may be applied to the aligned opening for coupling the vehicles, all of which can be accomplished by the operator from his seat on the tractor.

A further object of the invention is to provide a combination lifting and coupling device having means for normally retaining it in an applied position to prevent accidental uncoupling of a trailer and draft vehicle coupled thereby and which will readily retain itself on the drawbar of the draft vehicle when not in use.

A further and important object of the invention is to provide a device of the aforedescribed character which in addition to saving time and labor in performing the coupling and uncoupling operations, also constitutes a safety device which eliminates the need for the operator assuming a position between the trailer and draft vehicle so that should the vehicles tend to roll toward one another there is no danger of the operator being caught between the vehicles and injured thereby, which especially is apt to occur where the common practice by operators is resorted to of operating the tractor clutch from the ground while attempting to couple the vehicles.

Various other objects and advantages of the invention will hereinafter become more fully apparent from the following description of the drawing, illustrating a presently preferred embodiment thereof, and wherein:

Figure 1 is a side elevational view showing the invention being employed for coupling a trailer vehicle to a draft vehicle;

Figure 2 is an enlarged side elevational view, partly in vertical section showing the invention disposed in an operative position and connecting a drawbar of a draft vehicle to the tongue of a trailer vehicle;

Figure 3 is a top plan view of the parts as seen in Figure 2;

Figure 4 is a perspective view showing the invention being employed for alining the openings of the drawbar and tongue, and Figure 5 is a fragmentary, perspective view of a slightly modified form of the invention.

Referring more specifically to the drawing, for the purpose of illustrating a preferred application and use of the combination lifting and coupling pin constituting the invention and which is designated generally 5, the rear end of a conventional draft vehicle, illustrated as a tractor, is indicated at 6 and the forward end of a trailer vehicle is indicated at 7 and which is illustrated as a farm wagon although it will be readily apparent that any other type of trailer vehicle might be utilized, especially various types of farm implements and machinery. The tractor 6 is shown provided with a rearwardly extending drawbar 8 having a coupling pin receiving opening 9 extending vertically therethrough, adjacent the rear end thereof. The tractor 6 is shown provided with an operator's seat 10 which is located above and substantially directly over the drawbar 8. The trailer vehicle or wagon 7 is provided with a forwardly extending tongue 11 which is mounted for vertical swinging movement in a conventional manner and which is also swingable horizontally. The tongue 11 is shown provided at its forward, free end with upper and lower bars 12 and 13, respectively, which extend beyond the free end of the tongue 11 and which are secured thereto by fastenings 14. The bars 12 and 13, which are attached to the upper and lower sides of the tongue 11, respectively, are provided adjacent their forward ends with aligned openings 15 and the space between said bars 12 and 13 is sufficient to accommodate the rear end of the drawbar 8 therein, as clearly illustrated in Figures 2 and 4. As the description proceeds it will be readily apparent that the coupling and lift pin 5 could also be utilized with a tongue 11 not provided with the bars 12 and 13 but which is provided with a coupling pin opening formed directly therein, not shown. The parts 6 to 15, inclusive, form no part of the present invention but have been illustrated and described merely to provide a better understanding of the coupling and lift pin 5.

Said coupling and lift pin 5, as best illustrated in Figures 2 and 4, includes a relatively heavy gauge rod 16 the upper end of which is bent and shaped to form a handle 17 having a loop 18 formed therein to which is attached one end of a contractile coiled spring 19 the opposite end of which is anchored to an eye bolt or fastening 20 which is anchored in and rises from the upper surface of the drawbar 8 forwardly or inwardly of its coupling pin opening 9. The opposite, lower end of the rod 16 is bent to provide a laterally offset portion 21, an upper transverse portion 22 by which the offset portion 21 is connected to the remainder of the rod 16 and a lower transverse portion 23 which is disposed substantially parallel to the portion 22 and which constitutes the opposite end of the rod 16. A coupling pin 24 is disposed parallel to the longitudinal axis of the rod 16 and has its upper portion connected as by welding as seen at 25 in Figure 2 to the rod 16 and directly above the portion 22 and on the side of said rod remote to the portion 22. The coupling pin 24 has a lower free end portion which extends approximately one-half the distance between the portions 22 and 23 and said free end portion has a pointed lower end 26.

The lower end of the coupling pin 24 is adapted to engage the drawbar opening 9 and when disposed therein the combination lifting and coupling pin 5 will be substantially in an upright position and with the spring 19 under tension so as to hold the pin 24 in engagement with the opening 9 and to thereby support the lifting and coupling pin 5 on the drawbar 8 when not in use.

When it is desired to couple the draft vehicle 6 to the trailer vehicle 7, said draft vehicle 6 is backed up until the rear end of the drawbar 8 is adjacent the forward end of the tongue 11. The operator, not shown, from his position on the seat 10 can then grasp the handle 17 for disengaging the lifting and coupling pin 5 from the opening 9. The operator can then reach down with the coupling and lifting pin 5 as illustrated in Figure 1 for engaging the portion 23 under the tongue 11 or under the lower bar 13 thereof for lifting the forward end of the tongue until the space between the bars 12 and 13 is at approximately level of the drawbar 8. With the portion 21 functioning as an abutment or stop, the tongue 11 can be swung laterally so as to position the bars 12 and 13 above and beneath, respectively to the drawbar 8. With the openings 9 and 15 thus in alignment, by positioning the pointed end 26 in the upper opening 15 the spring 19 will move the lifting and coupling pin 5 downwardly for engaging the coupling pin 24 with the openings 9 and 15, as illustrated in Figure 2, to complete the coupling of the drawbar 8 and tongue 11. If said openings are not in full registry the pointed end 26 will function as a drift pin for bringing said openings into alignment as the lifting and coupling pin is forced downwardly. It will be readily apparent that the spring 19 will function to yieldably retain the pin 24 in engagement with the openings 9 and 15 to prevent accidental uncoupling of the drawbar and tongue.

If the openings 9 and 15 are not in alignment when the drawbar 8 is positioned in the space between the bars 12 and 13, the lower end of the pin 24 is engaged in the upper opening 15, as illustrated in Figure 4, after which the rod 16 is swiveled in the direction as indicated by the arrow in Figure 4 for swinging the tongue 11 relatively to the drawbar 8 until the openings 15 are aligned with the opening 9 and it will be readily apparent that this is accomplished by the rod portion 21 engaging a side edge of the drawbar 8 and functioning as a fulcrum around which the pin 5 will swing with the tongue 11.

To disengage the tongue 11 from the drawbar 8 it is only necessary to manually lift the pin 5 for disengaging the coupling pin 24 from the openings 9 and 15 after which said pin can be utilized as previously described for lowering the tongue 11 until the free end thereof is resting on the ground or the tractor 6 can be moved forwardly for disengaging the drawbar 8 from the tongue.

It will likewise be readily apparent that all the operations previously described can be accomplished by the operator from his position on the seat 10 and from which position he is conveniently located for operating the draft vehicle in assisting in accomplishing the coupling or uncoupling operations.

Another embodiment or modification of the lifting and coupling pin as illustrated in Figures 1 to 4 and which has been previously described, is illustrated in Figure 5. The coupling pin, designated generally 5a of Figure 5 is identical with the coupling pin 5 but is provided in addition with a collar 27 which is welded or otherwise secured as seen at 28 to the shank thereof adjacent the handle 17a. A strand of wire 29 is bent to provide a ring or loop 30 at one end thereof which engages loosely around the pin shank and which rests on the upper, substantially flat surface of the collar 27 and which is swivelly supported thereby on the lifting and coupling pin 5a. The opposite end of the strand 29 is turned downwardly at a point outwardly of the periphery of the collar 27 and said down-turned end terminates in a hook or eye 31 to which the upper end of the spring 19a is attached in lieu of being attached to the loop 18, as illustrated in Figures 1 to 4. As previously stated, the pin 5a is otherwise identical to the pin 5 and is intended to be utilized in the same manner and as previously described and illustrated in Figures 1 to 4. By attaching the spring 19a as illustrated in Figure 5 it will be readily apparent that said spring is disposed so that the coupling and lifting pin 5a can slide and rotate relatively thereto thus allowing a greater freedom of movement of the pin 5 without interference of the spring with the handle 17a. As the opposite end of the spring 19a is anchored to the drawbar in the same manner as illustrated in Figure 2, said spring will exert a downward pull through the collar 27 on the pin 5 for holding it in an applied position.

Various other modifications and changes are likewise contemplated and may obviously be resorted to, without departing from the spirit or scope of the invention as hereinafter defined by the appended claims.

I claim as my invention:

1. A combination coupling and lifting pin for connecting draft and trailer vehicles comprising a rod having a U-shaped portion formed at one end including a bight portion disposed parallel to the main portion of the rod, said U-shaped portion defining a hook which opens laterally of the rod, said hook being adapted to engage and lift a tongue for positioning the tongue to be coupled to a drawbar or the like of a draft vehicle, and a coupling pin fixed to said rod and extending into the open side of the hook.

2. A combination lifting and coupling pin as in claim 1, and resilient means yieldably tethering said pin to the drawbar and yieldably holding the coupling pin thereof in coupling engagement with the tongue and drawbar, said resilient means having one end connected to the rod and an opposite end connected to the drawbar.

3. A lifting and coupling pin as in claim 1, said coupling pin extending downwardly into the open side of the hook approximately one-half the length of said open side.

4. A lifting and coupling pin as in claim 1, said coupling pin being secured to the rod on the side thereof remote to the bight portion of the hook.

5. A lifting and coupling pin as in claim 1, the bight portion of said hook forming a fulcrum for cooperation with the coupling pin for aligning the openings of the tongue and drawbar when the coupling pin is in engagement with the opening of one of the other of said parts and said bight portion is bearing against the remaining part as a fulcrum surface.

6. A combination lifting and coupling pin as in claim 1, and resilient means yieldably tethering said pin to the drawbar and yieldably holding the coupling pin thereof in coupling engagement with the tongue and drawbar, said resilient means having one end swivelly connected to the rod and an opposite end connected to the drawbar, and means on the rod providing a limited sliding movement of the resilient means relatively to the rod.

DAVID A. HALL.

REFERENCES CITED

The following references are of record in the file of this patent:

UNITED STATES PATENTS

| Number | Name | Date |
|---|---|---|
| 602,710 | Wheeler | Apr. 19, 1898 |
| 1,887,054 | Wood | Nov. 8, 1932 |
| 2,072,391 | Varney | Mar. 2, 1937 |